(12) United States Patent
Kobayashi et al.

(10) Patent No.: US 10,761,667 B2
(45) Date of Patent: Sep. 1, 2020

(54) CAPACITIVE THREE-DIMENSIONAL SENSOR

(71) Applicant: Shin-Etsu Polymer Co., Ltd., Chiyoda-ku, Tokyo (JP)

(72) Inventors: Yusuke Kobayashi, Saitama (JP); Yuta Ishii, Saitama (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 0 days.

(21) Appl. No.: 16/313,159

(22) PCT Filed: Jun. 27, 2017

(86) PCT No.: PCT/JP2017/023528
§ 371 (c)(1),
(2) Date: Dec. 26, 2018

(87) PCT Pub. No.: WO2018/008466
PCT Pub. Date: Jan. 11, 2018

(65) Prior Publication Data
US 2019/0155422 A1 May 23, 2019

(30) Foreign Application Priority Data
Jul. 5, 2016 (JP) .................... 2016-133451

(51) Int. Cl.
*G06F 3/044* (2006.01)
*G06F 3/0354* (2013.01)
(Continued)

(52) U.S. Cl.
CPC .......... *G06F 3/044* (2013.01); *G06F 3/0354* (2013.01); *G06F 3/03547* (2013.01);
(Continued)

(58) Field of Classification Search
None
See application file for complete search history.

(56) References Cited

FOREIGN PATENT DOCUMENTS

| JP | 2016-91149 A | | 5/2016 |
|---|---|---|---|
| JP | 2016091149 A | * | 5/2016 |
| WO | 2012/033206 A1 | | 3/2012 |

OTHER PUBLICATIONS

International Search Report in PCT Application No. PCT/JP2017/023528, dated Sep. 19, 2017, 4pp.

* cited by examiner

*Primary Examiner* — Kenneth B Lee, Jr.
(74) *Attorney, Agent, or Firm* — Hauptman Ham, LLP

(57) ABSTRACT

A capacitive three-dimensional sensor includes: a light-guide unit having a side surface and an operation surface, the side surface being formed along the Z direction and including a light entering portion, through which light from a light source enters, the operation surface being configured to input the inputs and including a light output portion, from which the light exits; a sheet-like X-Y electrode body configured to sense the inputs in the plane X and Y directions; a deformable body including a sheet-like elastic body; and a sheet-like Z electrode body configured to sense the input in the Z direction. The light-guide unit includes an optional decorative sheet, and a light-guide sheet to guide the light that has entered the light-guide unit from the side surface and output the light toward the light output portion. A total of bending stiffnesses of the light-guide sheet and decorative sheet is less than 256.

20 Claims, 7 Drawing Sheets

(51) Int. Cl.
*G06F 3/041* (2006.01)
*F21V 8/00* (2006.01)
(52) U.S. Cl.
CPC ............ *G06F 3/041* (2013.01); *G06F 3/0414* (2013.01); *G02B 6/0058* (2013.01)

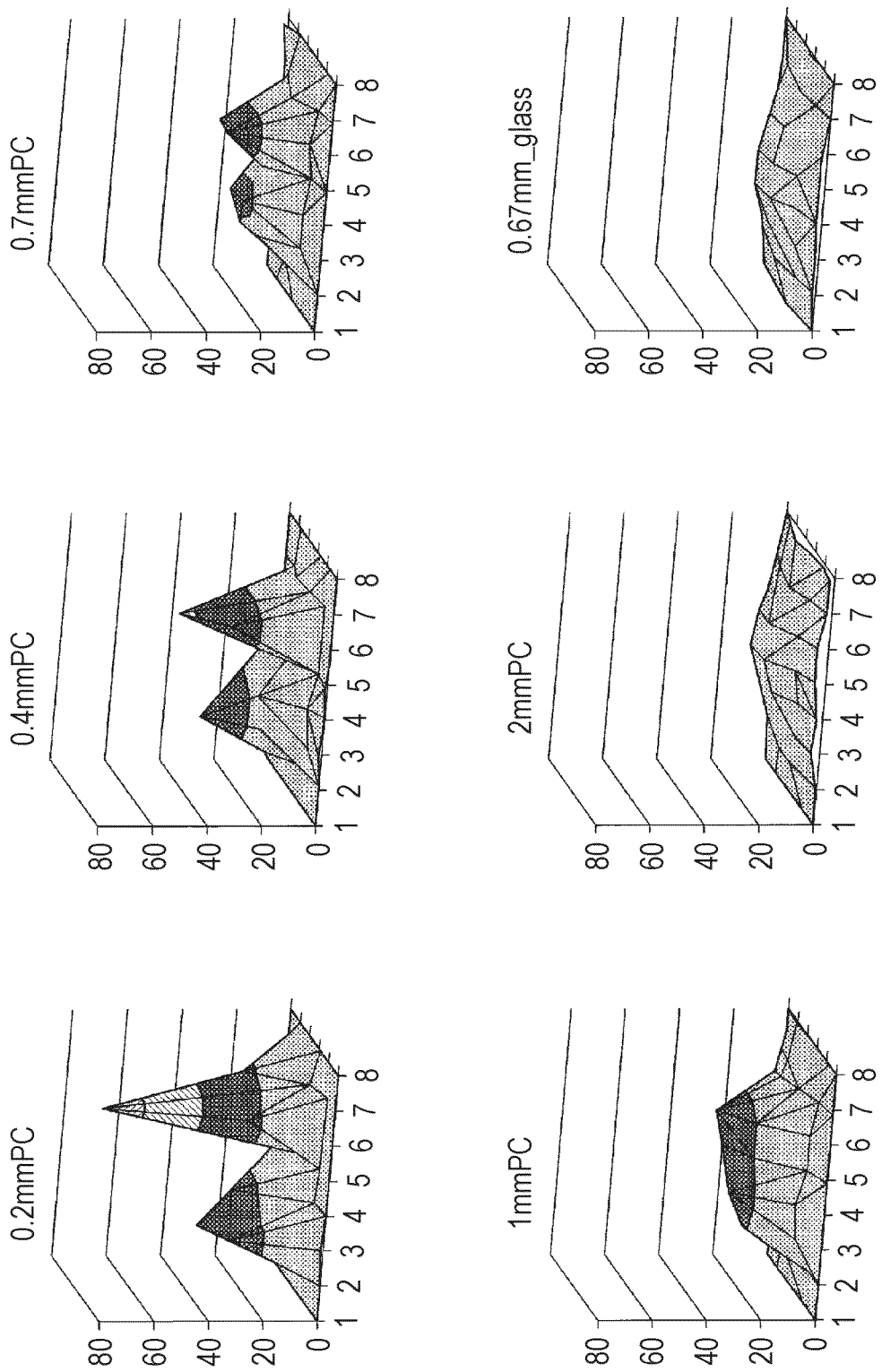

CAPACITIVE THREE-DIMENSIONAL SENSOR

RELATED APPLICATIONS

This application is a National Phase of PCT/JP2017/023528, filed Jun. 27, 2017.

TECHNICAL FIELD

This disclosure relates to a capacitive three-dimensional sensor having an operation surface illuminated from the inside. This application claims the benefit of Japanese Patent Application No. 2016-133451, filed on Jul. 5, 2016, which is hereby incorporated herein.

BACKGROUND ART

Of capacitive sensors to be used as touch sensors, those configured to detect a change in capacitance in two-dimensional directions (X direction and Y direction) have been the mainstream, but in recent years, those configured to detect a change in capacitance in three-dimensional directions (X direction, Y direction, and Z direction) are proposed (for example, Patent Literature 1).

CITATION LIST

Patent Literature

[PTL 1] JP 2016-091149 A

SUMMARY OF INVENTION

Technical Problem

For the purpose of improving visibility, operability, decorativeness, and other such properties of an operation surface of a touch sensor, it is desired to arrange an LED or other light source inside the sensor device to illuminate the operation surface from the inside to the outside. However, when the light source is arranged at the bottom of the sensor device, three or more layers, for example, electrode sheets configured to sense X, Y, and Z directions, are interposed between the light source and the operation surface, which is arranged above the light source, and hence there is a problem in that a luminance (light amount) of light that reaches the operation surface from the light source is reduced.

It is an object of this disclosure to provide a capacitive three-dimensional sensor, which is capable of illuminating an operation surface of a touch sensor at a high luminance from the inside of the device without impairment of sensitivity of the touch sensor.

Solution to Problem

[1] There is provided a capacitive three-dimensional sensor, which is configured to sense inputs in plane X and Y directions and a depth Z direction, the capacitive three-dimensional sensor including: a light-guide unit having a side surface and an operation surface, the side surface being formed along the depth Z direction and including a light entering portion, through which light from a light source enters, the operation surface being configured to input the inputs and including a light output portion, from which the light exits; a sheet-like X-Y electrode body configured to sense the inputs in the plane X and Y directions; an easily deformable body including a sheet-like elastic body; and a sheet-like Z electrode body configured to sense the input in the depth Z direction, the light-guide unit, the sheet-like X-Y electrode body, the easily deformable body, and the sheet-like Z electrode body being arranged in the stated order to overlap one another when viewed in the depth Z direction, the light-guide unit including a decorative sheet, which is provided optionally, and a light-guide sheet configured to guide the light that has entered the light-guide unit from the side surface and output the light toward the light output portion, the decorative sheet and the light-guide sheet being arranged in the stated order to overlap each other when viewed in the depth Z direction, the light-guide sheet having a bending stiffness D1 calculated by the following equation (1) and the decorative sheet having a bending stiffness D2 calculated by the following equation (2), D1 and D2 totaling less than 256:

$$D1=(E1)\times(h1)^3\div[12\times\{1-(v1)^2\}] \quad \text{Equation (1)}$$

$$D2=(E2)\times(h2)^3\div[12\times\{1-(v2)^2\}] \quad \text{Equation (2)}$$

where D1, E1, h1, and v1 represent the bending stiffness (unit: N·mm), a bending modulus (unit: N/mm$^2$), a thickness (unit: mm), and a Poisson ratio of the light-guide sheet, respectively, and D2, E2, h2, and v2 represent the bending stiffness (unit: N•mm), a bending modulus (unit: N/mm$^2$), a thickness (unit: mm), and a Poisson ratio of the decorative sheet, respectively.

[2] In the capacitive three-dimensional sensor according to Item [1], the thickness of the light-guide sheet is 0.1 mm or more and 0.7 mm or less.

[3] In the capacitive three-dimensional sensor according to Item [1] or [2], the thickness of the decorative sheet is 0.1 mm or more and 0.7 mm or less.

[4] In the capacitive three-dimensional sensor according to any one of Items [1] to [3], the thickness of the light-guide sheet and the thickness of the decorative sheet total 0.1 mm or more and 0.7 mm or less.

[5] In the capacitive three-dimensional sensor according to any one of Items [1] to [4], the decorative sheet is bonded on a surface of the light-guide sheet via a pressure-sensitive adhesive.

[6] In the capacitive three-dimensional sensor according to any one of Items [1] to [5], each of the light-guide sheet and the decorative sheet is a resin sheet independently formed of a resin material.

In the light-guide unit, the presence or absence of the decorative sheet is selected freely. When the decorative sheet is not provided, it is assumed that the thickness h2 in the equation (2) is 0, and thus the bending stiffness D2 of the decorative sheet is 0.

Advantageous Effects of Invention

According to the capacitive three-dimensional sensor of this disclosure, the light-guide unit is arranged immediately below the operation surface, and hence a luminance (light amount) of light that is output from the light output portion can be more increased than before. As a result, visibility, operability, decorativeness, and other such properties of the operation surface can be improved.

Moreover, with the stiffnesses of the light-guide sheet and the decorative sheet, which form the light-guide unit, being appropriate, the operation surface that is touched is easily dented by an appropriate degree in the Z direction, and the input (pressing force) in the Z direction can be sensed with high sensitivity.

BRIEF DESCRIPTION OF DRAWINGS

FIG. 8 is graphs for showing results obtained by checking an operation surface of the three-dimensional sensor produced in Example 1 on whether or not individual pressing can be sensed separately when two points are pressed simultaneously.

DESCRIPTION OF EMBODIMENTS

First Embodiment

A capacitive three-dimensional sensor (hereinafter abbreviated as "three-dimensional sensor") according to a first embodiment of this disclosure is described with reference to the drawings.

In all of the drawings to be described below, a ratio of a thickness and dimensions of each component does not necessarily correspond to an actual ratio, and is adjusted as appropriate for visibility of the drawings.

Figure 1:
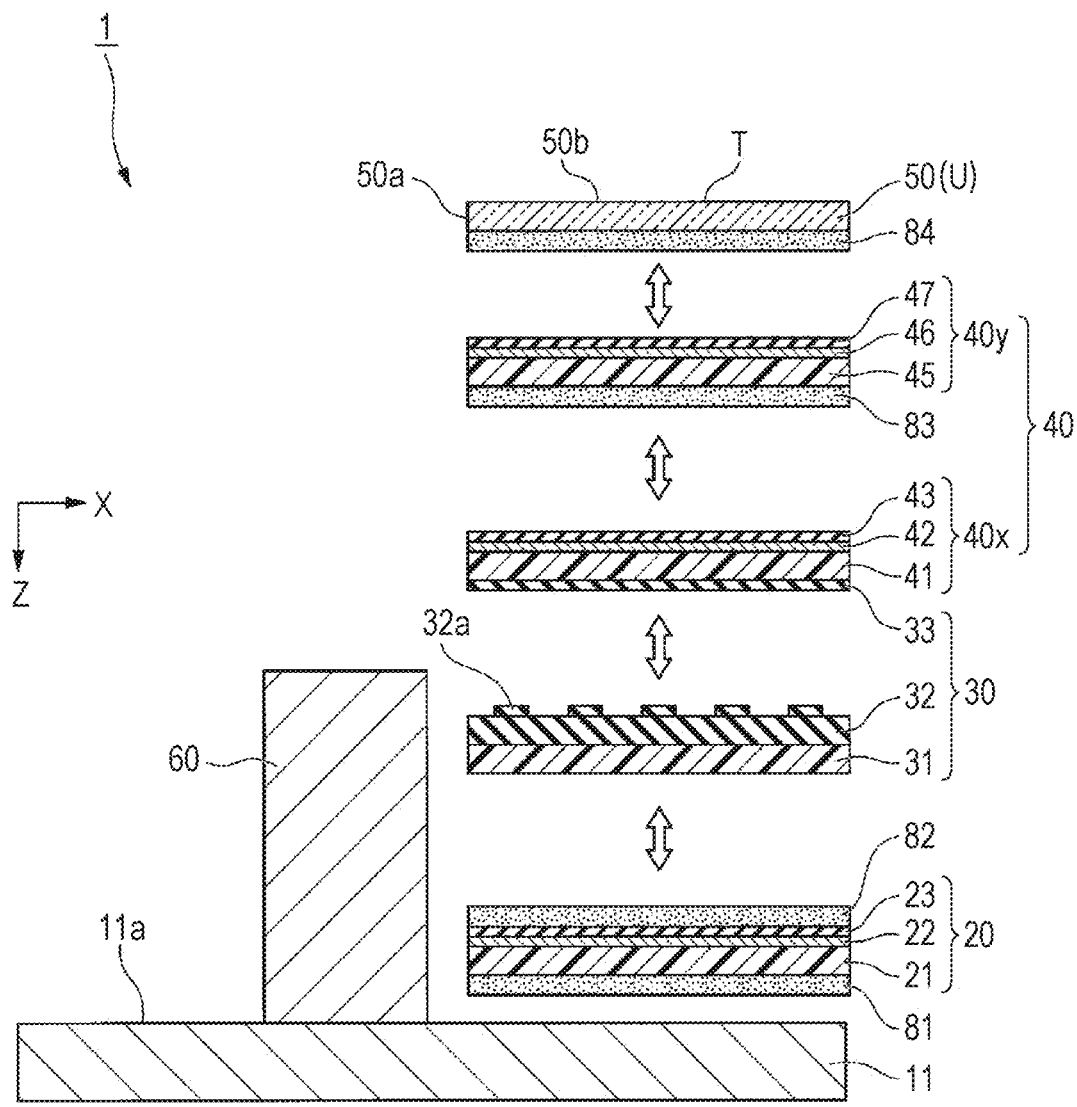
FIG. 1 is an exploded cross-sectional view of a capacitive three-dimensional sensor 1 according to a first embodiment of this disclosure.
Figure 2:
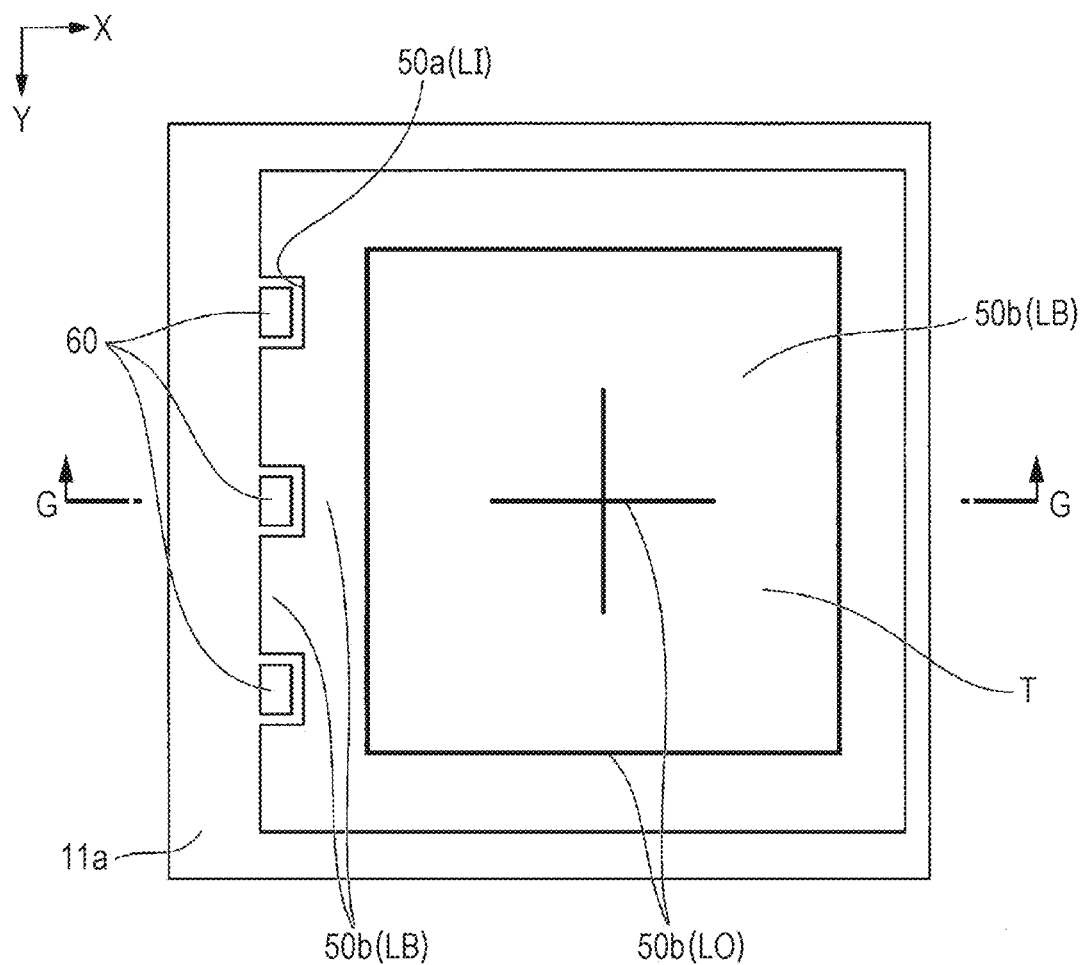
FIG. 2 is a plan view of the capacitive three-dimensional sensor 1 according to the first embodiment of this disclosure.

FIG. 1 is an exploded cross-sectional view of a three-dimensional sensor 1 according to the first embodiment, and FIG. 2 is a plan view of the three-dimensional sensor 1. A cross section taken along the line G-G of FIG. 2 is the cross section of FIG. 1.

In FIG. 1, a right-hand direction of the sheet is an X direction, a downward direction of the sheet is a Z direction, and a front direction of the sheet, which is perpendicular to the X direction and the Z direction, is a Y direction.

In FIG. 2, a right-hand direction of the sheet is the X direction, a downward direction of the sheet is the Y direction, and a depth direction of the sheet, which is perpendicular to the X direction and the Y direction, is the Z direction.

The three-dimensional sensor 1 illustrated in FIG. 1 and FIG. 2 is a capacitive three-dimensional sensor, which is configured to sense inputs in plane X and Y directions and a depth Z direction, including: a light-guide unit U having a side surface and an operation surface T, the side surface being formed along the depth Z direction and including light entering portions LI, through which light from light sources 60 enters, the operation surface T being configured to receive the inputs and including a light output portion LO, from which the light exits; a sheet-like X-Y electrode body 40, which is configured to sense the inputs in the plane X and Y directions; an easily deformable body 30 having a sheet-like elastic body 32; and a sheet-like Z electrode body 20, which is configured to sense the input in the depth Z direction.

When the three-dimensional sensor 1 is viewed in the depth Z direction (thickness direction of the sensor), the light-guide unit U, the X-Y electrode body 40, the easily deformable body 30, and the Z electrode body 20 are laminated on a front surface 11a of a support member 11 so as to overlap one another in the stated order. In the vicinity of the laminated body, the light sources 60, for example, LEDs, are placed on the front surface 11a of the support member 11.

In this specification, the light-guide unit U side is referred to as "front side" or "front surface side", and the support member 11 side is referred to as "back side" or "back surface side".

As illustrated in FIG. 1, the light-guide unit U of the three-dimensional sensor 1 is formed of a light-guide sheet 50. The light-guide sheet 50 (light-guide unit U) and the X-Y electrode body 40 are joined to each other via an adhesive layer 84. A side surface 50a of the light-guide sheet 50 that is closer to the light sources 60 is arranged to be opposed to light output portions of the light sources 60 to form the light entering portions LI, through which the light from the light sources 60 enters. With this arrangement, the light illuminated from the light sources 60 enters the light-guide sheet 50 from the light entering portions LI and propagates through the sheet. For the purpose of allowing the light from the light sources 60 to efficiently enter the light entering portions LI, the light sources 60 may be brought into intimate contact with the light entering portions LI. A print is partially applied on a front surface 50b of the light-guide sheet 50, which is made of a transparent member, and the transparency is adjusted with light and shade of the print to form output portions LO, which are transparent, and a light-shielding portion LB, which is opaque. The light that has propagated through the light-guide sheet 50 is output from the light output portions LO of the front surface 50b.

In this specification, the term "transparent" means a light transmittance of 50% or more, which is measured in accordance with JIS K7105. Moreover, the term "opaque" means the above-mentioned light transmittance of less than 50%.

As illustrated in FIG. 2, on the operation surface T, which is formed of the front surface 50b of the light-guide sheet 50, there are formed the light-shielding portion LB, in which light is shielded by solid painting print, and the light output portions LO having rectangular and cross shapes, which is transparent with no print against the background of the light-shielding portion LB. The above-mentioned rectangular shape corresponds to an input area, with which a finger or stylus pen is brought into contact. The outside of the input area is surrounded by a housing frame of an apparatus on which the three-dimensional sensor 1 is mounted, and hence when viewed from above, the light sources 60 are hidden out of sight by the housing frame. There are a plurality of light sources 60, and the light-guide sheet 50 is also arranged between the light sources 60 to surround three directions of each light source 60. With this arrangement, the light entering portions LI, which are formed by the side surface 50a of the light-guide sheet 50, are arranged so as to surround the three directions of the light sources 60 and be opposed to the light output portions of the respective light sources 60. The side surface 50a in the light entering portions LI is formed to rise and fall as in a sawtooth pattern to disperse the light entering light into the light-guide sheet 50.

In the example of FIG. 2, the light entering portions LI surround the three directions, but there may be adopted a configuration in which the light entering portion LI is opposed in only one direction, that is, the side surface 50a of the light-guide sheet 50 may be linear. Moreover, for the purpose of preventing the light from the light sources 60 from leaking toward the top or side other than the light entering portions LI, the top and side of the light sources 60 may be covered by the light-guide sheet 50 or other member.

Moreover, in the example of FIG. 2, the rectangular shape and cross shape are drawn by the light output portions LO, but without being limited to the rectangular shape and cross shape, any figure or letter may be used instead.

The light output portions LO formed on the front surface 50b (operation surface T) of the light-guide sheet 50 are not limited in terms of their configurations as long as the light output portions LO are regions that allow light to pass therethrough, and are formed of light-transmissive regions excluding opaque regions formed on the front surface 50b by printing or other such method, for example.

The light sources 60 are not particularly limited as long as the light sources 60 can output the light to the side surface 50a of the light-guide sheet 50, and examples of the light sources 60 include light-emitting diodes (LEDs) and cathode ray tubes.

Lamination Structure of the Three-Dimensional Sensor

The support member 11 and the Z electrode body 20 are bonded to each other via an adhesive layer 81 using a pressure-sensitive adhesive. The Z electrode body 20 and the easily deformable body 30 are bonded to each other via an adhesive layer 82 formed of a pressure-sensitive adhesive. The easily deformable body 30 and the X-Y electrode body 40 are bonded to each other through the intermediation of a silicone rubber sheet 33. The X-Y electrode body 40 and the light-guide sheet 50 are bonded to each other via the adhesive layer 84 using a pressure-sensitive adhesive.

Now, details of the components are described in order from the support member 11 side.

Support Member

The support member 11 of the three-dimensional sensor 1 includes a substrate and a shield layer (not shown), which is formed on a front surface of the substrate. The substrate is not particularly limited in terms of its constituent material, and examples thereof include a paper epoxy substrate, a glass epoxy substrate, a paper phenol substrate, and a metal plate. The shield layer is a metal layer, and is made of copper, aluminum, or silver, for example. The shield layer is a solid metal layer without any pattern. As the support member 11 including the substrate and the shield layer, a printed board may be used, for example. When the support member 11 is a metal plate, the metal plate itself serves as the shield layer, and hence a separately provided shield layer is not necessarily required.

It is preferred that the thickness of the support member 11 be a thickness with which the light sources 60 and electrode bodies to be placed on the front surface 11a thereof can be structurally supported, and may be from about 0.1 mm to about 10 mm, for example.

The shape of the support member 11 is not limited to a plate shape, and any shape can be adopted as long as other constituent members can be supported with the shape, examples of which include a curved surface that is curved in a one-axis direction.

Z Electrode Body

The Z electrode body 20 is an electrode body configured to detect an input in the Z direction, and is an electrode sheet including a third base material sheet 21, a patterned conductive film 22, which is formed on a front surface of the third base material sheet 21, and an insulating film 23, which covers front surfaces of the third base material sheet 21 and the conductive film 22.

In this specification, the term "conductive" in the conductive film means an electrical resistance value of less than 1 MΩ and preferably less than 0.1 MΩ, and the term "insulating" in the insulating film means the electrical resistance value of 1 MΩ or more and preferably 10 MΩ or more.

A constituent material of the third base material sheet 21 is, for example, a plastic film or a glass sheet. As a resin forming the plastic film, polyethylene terephthalate, polycarbonate, polyimide, triacetyl cellulose, cyclic polyolefin, or an acrylic resin may be used. Of those, polyethylene terephthalate (PET) or polycarbonate is preferred because of high heat resistance, high dimensional stability, and low cost.

The third base material sheet 21 has a thickness of, for example, from 10 μm to 100 μm.

The third base material sheet 21 may be transparent or opaque.

Examples of the conductive film 22 include: a film formed of a conductive paste containing, for example, gold particles, silver particles, copper particles, nickel particles, aluminum particles, chromium particles, or tin-doped indium oxide; a film containing a conductive polymer, for example, polythiophene; a film containing a metal nanowire of, for example, gold or silver; a film containing a conductive carbon material, such as carbon nanofiber, carbon nanobud, carbon black, carbon nanotube, or graphene; and a metal deposition film of, for example, gold, silver, or tin-doped indium oxide.

On a surface of the conductive film 22, plasma treatment, ultraviolet irradiation treatment, corona treatment, excimer laser treatment, and other various surface treatments may be applied. When a surface treatment is applied on the conductive film 22, adhesion with respect to the insulating film 23 is increased, and a contact resistance is reduced.

The thickness of the conductive film 22 is from about 0.01 μm to about 25 μm, for example.

A known pattern with which an input in the Z direction can be sensed is applied to the pattern shape of the conductive film 22, examples of which include a pattern in which rectangular or linear conductive portions are arranged at freely-selected pitches as described in Patent Literature 1.

A routing wiring, a wiring for an external connection terminal, or other such wiring lines for externally outputting a signal detected by the pattern of the conductive film 22 are also formed on the third base material sheet 21.

The insulating film 23 is a film made of an insulating resin, and may increase adhesion with respect to the adhesive layer 82 and the easily deformable body 30 and prevent oxidation of the conductive film 22 and the wiring lines.

Examples of the insulating resin include a thermosetting resin, a visible light curing resin, an electron beam curing resin, and an ultraviolet curing resin. Of those insulating resins, the ultraviolet curing resin is preferred from the viewpoint of small thermal shrinkage during curing.

The thickness of the insulating film 23 is from about 0.5 μm to about 50 μm, for example.

Instead of the above-mentioned configuration, a so-called rigid substrate having low flexibility may be applied to the third base material sheet 21. Examples of the rigid substrate include a glass epoxy substrate, a paper epoxy substrate, and a paper phenol substrate. As a conductive film on the rigid substrate, a configuration in which a copper film or other metal foil is bonded on the rigid substrate may be adopted.

Moreover, the support member 11 and the Z electrode body 20 may be integrated by using the substrate of the support member 11 as the third base material sheet 21 and forming the conductive film 22 and the insulating film 23 on the front surface of the substrate. In this case, a shield layer may be provided on a back surface of the substrate.

Easily Deformable Body

The easily deformable body 30 is a sheet that is elastically deformable when a part of the operation surface T, which is formed of the front surface 50b of the light-guide sheet 50, is pressed (compressed) toward the support member 11 side, and includes an elastic body base material sheet 31, the sheet-like elastic body 32, which is formed on a front surface of the elastic body base material sheet 31, and the silicone rubber sheet 33 configured to bond the elastic body 32 to the X-Y electrode body 40.

As the elastic body base material sheet 31, a sheet similar to the third base material sheet 21 of the Z electrode body 20 may be applied, for example. Materials and thicknesses of the elastic body base material sheet 31 and the third base material sheet 21 may be the same or different.

The thickness of the elastic body base material sheet 31 is from 10 μm to 100 μm, for example.

The elastic body 32 is a sheet made of an elastic material, and has a large number of protruding elastic spacers 32a formed on a surface thereof. Each of the elastic spacers 32a is provided so that its top surface faces the X-Y electrode body 40 side (front surface side). Moreover, the plurality of elastic spacers 32a are arranged to be uniformly dispersed over the entire front surface of the elastic body 32. Therefore, when the front surface of the elastic body 32 is planarly viewed, a dot pattern in which the top surfaces of the elastic spacers 32a are uniformly dispersed all over the surface can be seen.

Examples of the shape of the top surface of each elastic spacer 32a include a circle, an ellipse, a rectangle, and other polygons.

It is preferred that the elastic body 32 having a thickness of 1 cm have a Shore A hardness of 85 or less. When the above-mentioned Shore A hardness is 85 or less, the elastic body 32 can easily be deformed when being pressed. It should be noted, however, that when the elastic body 32 is excessively soft, recovery after the elastic deformation is delayed, and hence it is preferred that the above-mentioned Shore A hardness be 10 or more.

In the three-dimensional sensor 1, when the operation surface T of the light-guide unit U is not pressed, an interval between the X-Y electrode body 40 and the Z electrode body 20 is maintained with the thickness of the easily deformable body 30 by being supported by the easily deformable body 30.

Meanwhile, when the operation surface T of the light-guide unit U is pressed toward the support member 11 side, the elastic body 32, in particular, the elastic spacers 32a are deformed to be crushed in the pressed part, and a separation distance between the X-Y electrode body 40 and the Z electrode body 20 is locally reduced. As a result, the input (positional change) in the Z direction is detected as a change in capacitance of the Z electrode body 20.

Examples of the elastic material for forming the elastic body 32 include: thermosetting elastomers, such as a urethane rubber, an isoprene rubber, an ethylene propylene rubber, a natural rubber, an ethylene-propylene-diene rubber, a styrene-butadiene rubber, and a silicone rubber; thermoplastic elastomers, such as a urethane-based, ester-based, styrene-based, olefin-based, butadiene-based, or fluorine-based elastomer; and composites thereof. As a constituent material of the elastic body 32, silicone rubber, which has small changes in dimensions, that is, small compression set in response to repeated pressing, is preferred.

The height of the elastic spacers 32a is preferably 30 μm or more and 150 μm or less, and more preferably 40 μm or more and 100 μm or less. With the height of the elastic spacers 32a being the above-mentioned lower limit or more, the X-Y electrode body 40 is more easily deformed to secure a sufficient displacement amount when the operation surface T of the light-guide unit U is pressed. With the height of the elastic spacers 32a being the above-mentioned upper limit or less, holding power exhibited when the operation surface T of the light-guide unit U is not pressed is increased, and it is possible to prevent a reduction in sensitivity of sensing an input in the Z direction.

Examples of the layout of the plurality of elastic spacers 32a on the surface of the elastic body 32 include layouts of a 60-degree staggered pattern, a radially staggered pattern, a parallel pattern, and a grid pattern.

The pitch between adjacent elastic spacers is preferably 0.1 mm or more and 2.0 mm or less, and more preferably 0.1 mm or more and 1.0 mm or less. With the pitch between the adjacent elastic spacers being the above-mentioned lower limit or more, the X-Y electrode body 40 can be deformed more easily when the operation surface T of the light-guide unit U is pressed.

The easily deformable body 30 and the X-Y electrode body 40 are bonded to each other through the intermediation of the silicone rubber sheet 33. The surface of the silicone rubber sheet is subjected to ultraviolet treatment, corona treatment, plasma treatment, or other easy-bonding treatment, for example. With strong adhesiveness imparted by this treatment, the silicone rubber sheet 33 fixed to a back surface of the X-Y electrode body 40 and the top surfaces of the elastic spacers 32a are bonded without sliding in the plane direction.

The elastic body 32 and the X-Y electrode body 40 may adhere to each other via an adhesive layer instead of the silicone rubber sheet 33, or a sheet member made of a material other than silicone rubber may be used.

X-Y Electrode Body

The X-Y electrode body 40 is an electrode body for use in detecting inputs in the X direction and the Y direction, and is provided on the front surface side of the easily deformable body 30. The X-Y electrode body 40 in the first embodiment is an electrode sheet laminated body obtained by laminating a first electrode sheet 40x and a second electrode sheet 40y.

The first electrode sheet 40x includes a first base material sheet 41, a patterned conductive film 42, which is formed on a front surface of the first base material sheet 41, and an insulating film 43, which covers front surfaces of the first base material sheet 41 and the conductive film 42.

The first base material sheet 41, the conductive film 42, and the insulating film 43 may be those similar to the third base material sheet 21, the conductive film 22, and the insulating film 23 of the Z electrode body 20, for example.

The thickness of the first electrode sheet 40x is from 10 μm to 100 μm, for example.

A known pattern with which inputs in the X direction and the Y direction can be sensed is applied as the pattern shape of the conductive film 42, examples of which include a pattern in which rectangular or linear conductive portions are arranged at freely-selected pitches as described in Patent Literature 1.

Along with the pattern of the conductive film 42, a routing wiring, a wiring for an external connection terminal, or other such wiring lines for externally outputting a signal detected by the pattern are also formed on the first base material sheet 41.

The second electrode sheet 40y includes a second base material sheet 45, a patterned conductive film 46, which is formed on a front surface of the second base material sheet 45, and an insulating film 47, which covers front surfaces of the second base material sheet 45 and the conductive film 46.

Description of the second base material sheet 45, the conductive film 46, and the insulating film 47 is similar to that of the first base material sheet 41, the conductive film 42, and the insulating film 43, and hence is omitted.

The first electrode sheet 40x and the second electrode sheet 40y, which form the X-Y electrode body 40, may each be configured to sense any one of an input in the X direction and an input in the Y direction, or both of the electrode sheets 40x and 40y may be configured to cooperate to sense both of the input in the X direction and the input in the Y direction (with one of which being of a transmitter type and the other being of a receiver type, for example).

The X-Y electrode body 40 is interposed between the light-guide unit U (light-guide sheet 50) and the easily deformable body 30. In a case where the X-Y electrode body 40 is so thick as not to deform at all, even when a pressing force is received on a local part of the operation surface T of the light-guide unit U, the entire surface of the easily deformable body 30 is pressed. In this case, the input in the Z direction is sensed, but it is difficult to locally sense the input in association with the X and Y directions.

In order to sense the above-mentioned local part, it is preferred that the X-Y electrode body 40 also have such softness as to be able to deform with the deformation of the light-guide unit U. Therefore, the total thickness of the X-Y electrode body 40 is preferably 0.4 mm or less, more preferably 0.3 mm or less, and further preferably 0.25 mm or less. A lower limit value of the total thickness of the X-Y electrode body 40 is not particularly limited, but is 0.05 mm or more, for example.

Light-Guide Unit

The light-guide unit U in the first embodiment is formed of the light-guide sheet 50 made of a sheet-like transparent material.

As the transparent material, for example, a transparent resin or glass may be used. As the transparent resin, for example, polyethylene terephthalate, polycarbonate, polyimide, triacetyl cellulose, cyclic polyolefin, an acrylic resin, a silicone rubber, a urethane rubber, and other elastomers may be used. Of those materials, polycarbonate, an acrylic resin, or cyclic polyolefin is preferred for its excellent light guiding property. It is preferred that the light-guide sheet 50 be formed of a transparent resin sheet.

It is preferred that the thickness of the light-guide sheet 50 be as thick as possible from the viewpoint of increasing a luminance of the output light, but be as thin as possible from the viewpoint of easily transferring a pressing force that is input in the Z direction on the operation surface T to the easily deformable body 30. In consideration of those contradicting conditions, the thickness of the light-guide sheet 50 is preferably 0.05 mm or more and 1 mm or less, more preferably 0.10 mm or more and 0.70 mm or less, even more preferably 0.10 mm or more and 0.40 mm or less, further preferably 0.10 mm or more and 0.30 mm or less, particularly preferably 0.10 mm or more and 0.25 mm or less, and most preferably 0.10 mm or more and 0.20 mm or less, for example.

When the light guide sheet 50 is formed of polyethylene terephthalate, polycarbonate, polyimide, triacetyl cellulose, cyclic polyolefin, or an acrylic resin, the thickness thereof preferably falls within the suitable range described above.

When the light-guide sheet 50 is formed of glass, its thickness is preferably 0.05 mm or more and 0.35 mm or less, more preferably 0.05 mm or more and 0.30 mm or less, even more preferably 0.05 mm or more and 0.25 mm or less, further preferably 0.05 mm or more and 0.20 mm or less, particularly preferably 0.05 mm or more and 0.15 mm or less, and most preferably 0.05 mm or more and 0.10 mm or less.

From the viewpoints of reliably transferring the pressing force to the easily deformable body 30 and increasing the sensitivity of sensing the input in the Z direction, a bending stiffness D1 of the light-guide sheet 50, which is calculated by the following equation (1), is preferably less than 256, more preferably 32 or less, further preferably 20 or less, particularly preferably 16 or less, and most preferably 10 or less.

A lower limit value of the bending stiffness D1 is not particularly limited, and is preferably 0.1 or more.

$$D1 = (E1) \times (h1)^3 \div [12 \times \{1-(v1)^2\}], \qquad \text{Equation (1)}$$

where D1, E1, h1, and v1 represent the bending stiffness (unit: N·mm), a bending modulus (unit: N/mm$^2$), a thickness (unit: mm), and a Poisson ratio of the light-guide sheet 50, respectively.

The bending modulus (Young's modulus) E1 of the light-guide sheet 50 is measured under a condition of a temperature of 20° C. in accordance with the method of JIS K7171:2008 (IS0178:2001).

Examples of a method of measuring the thickness h1 of the light-guide sheet 50 include a micrometer, a digimatic indicator, laser displacement measurement, observation of a cross section using a scanning electron microscope, and other such known methods. An average value of thicknesses measured at any five points on the light-guide sheet 50 is defined as a thickness h1 of the light-guide sheet 50.

The Poisson ratio v1 of the light-guide sheet 50 is measured under a condition of a temperature of 20° C. with the use of a non-contacting video extensometer (for example, biaxial video extensometer (AVE) from DJK Corporation), for example.

Normally, the Poisson ratio v1 of the light-guide sheet is not significantly different from a general property value of the transparent material forming the light-guide sheet, and hence the general property value of the transparent material may be provisionally used instead of the Poisson ratio v1 of the light-guide sheet. Specifically, a Poisson ratio of general glass is from about 0.20 to about 0.25, and a Poisson ratio of a general thermoplastic resin is from about 0.20 to about 0.40.

In general, a Poisson ratio is calculated by the equation:

$$\{\varepsilon 2 \div \varepsilon 1 \times (-1)\}$$

by measuring a longitudinal strain $\varepsilon 1$, which is generated by uniaxial stress, and a lateral strain $\varepsilon 2$, which is orthogonal to the longitudinal strain. The lateral strain $\varepsilon 2$ may include two mutually orthogonal directions, but may be considered to be constant irrespective of the direction for convenience in this disclosure with no practical problem. Moreover, when the two directions of the lateral strain are considered separately, the smaller value of the two lateral strains is adopted in this disclosure .

The thickness of the print applied on the front surface 50b of the light-guide sheet 50 is sufficiently thin (for example, 0.01 mm or less) as compared to the thickness of the light-guide sheet 50, and hence the print has little effect on the bending stiffness D1 of the light-guide sheet 50.

The print may be applied not on the front surface 50b but on a back surface, which is the side opposite to the front surface 50b, of the light-guide sheet 50. The "print" in this specification includes not only a coating film containing a pigment and a dye, but also a discontinuous (excluding the light output portion), non-conductive metal deposition film.

Instead of the above-mentioned configuration, when the entire operation surface T is to radiate light (light is radiated from the entire surface), it is not required to provide the light-shielding portion LB, which is formed by printing, on the front surface 50b of the light-guide sheet 50.

Adhesive Layer

To the adhesive layers 81, 82, 83, and 84 for bonding the sheets forming the three-dimensional sensor 1, an adhesive layer using a known curable adhesive (which is a liquid adhesive before bonding, and exhibits little adhesive strength before curing) or a pressure-sensitive adhesive (which is a gel-like pressure-sensitive adhesive before bonding, and exhibits adhesiveness with respect to a pressed adherend) is applied. Moreover, the adhesive layer may be a base material adhesive layer in which an adhesive or a pressure-sensitive adhesive is arranged on both sides of a base material layer. Examples of the base material adhesive layer include a known double-sided tape.

Examples of the adhesive and the pressure-sensitive adhesive include an acrylic resin, a polyurethane resin, and an ethylene vinyl acetate copolymer. The curable adhesive may be of a solvent type containing a solvent, which volatilizes during curing, or of a hot melt type.

As the curable adhesive, a polyester type hot melt adhesive is preferred, for example.

As the pressure-sensitive adhesive, an acrylic pressure-sensitive adhesive containing a (meth)acrylic resin is preferred, for example.

Each of the adhesive layers 81, 82, 83, and 84 may be transparent or opaque. The thickness of each adhesive layer is from 1 μm to 75 μm, for example. It is preferred that the thickness of the adhesive layer using the adhesive be from 1 μm to 20 μm. It is preferred that the thickness of the adhesive layer using the pressure-sensitive adhesive be from 10 μm to 75 μm. When the thickness falls within the above-mentioned range, the adhesive layer has little effect on the bending stiffness D1 of the light-guide sheet 50.

Of the adhesive layers, it is preferred that the adhesive layer 84, which bonds the light-guide sheet 50 and the X-Y electrode body 40 to each other, bean adhesive layer using a pressure-sensitive adhesive. When the adhesive layer 84 is the adhesive layer using the pressure-sensitive adhesive, the bending stiffness D1 of the light-guide sheet 50 is not affected by the stiffness of the X-Y electrode body 40, and the bending stiffness D1 of the light-guide sheet 50 may be considered as an entity that is separate from the X-Y electrode body 40.

Second Embodiment

Figure 3:
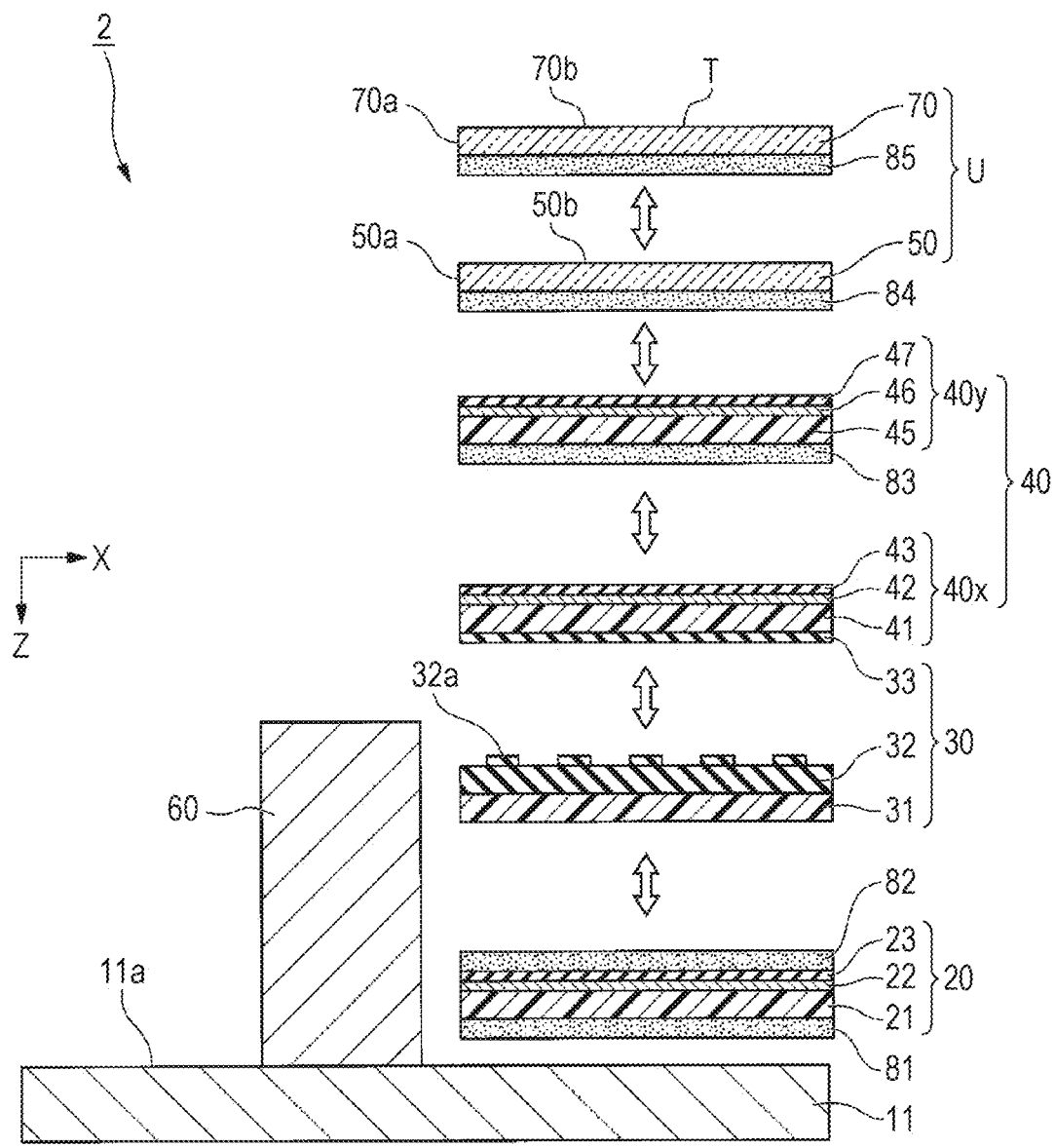
FIG. 3 is an exploded cross-sectional view of a capacitive three-dimensional sensor 2 according to a second embodiment of this disclosure.

FIG. 3 is an exploded cross-sectional view of a three-dimensional sensor 2 according to a second embodiment of this disclosure. Members that are the same as those of the three-dimensional sensor 1 according to the first embodiment are denoted by the same reference symbols, and description thereof is omitted.

In the second embodiment, the light-guide unit U is formed of the light-guide sheet 50 and a decorative sheet 70. To the front surface 50b of the light-guide sheet 50, the decorative sheet 70 is bonded via an adhesive layer 85.

On the front surface 50b of the light-guide sheet 50 in the second embodiment, letters are printed as the light-shielding portion LB, and a portion of the front surface 50b other than the portion on which the letters are printed serves as the light output portion configured to output light to the front side.

As another embodiment, there may be adopted a configuration in which a print is not applied on the front surface 50b, but a diffusion print configured to diffuse light to any point on the back surface is applied on the front surface 50b. For example, when the diffusion print is applied in a pattern, light corresponding to the pattern is reflected on the back surface to be output from the front surface 50b.

Decorative Sheet

The decorative sheet 70 is made of a sheet-like material, which may be a transparent material or an opaque material. It is preferred that the decorative sheet 70 be formed of a transparent resin sheet.

When the decorative sheet 70 is made of a transparent material, a back surface thereof faces the light output portion of the light-guide sheet 50, and the light output from the light-guide sheet 50 enters the decorative sheet 70 from the back surface of the decorative sheet 70. A print is partially applied on a front surface 70b or the back surface of the decorative sheet 70, and the transparency is adjusted with light and shade of the print to form the light output portions LO, which are transparent, and the light-shielding portion LB, which is opaque. The light that has passed through the decorative sheet 70 is output from the light output portions LO of the front surface 70b.

When the decorative sheet 70 is made of an opaque material, a light transmitting hole piercing the decorative sheet 70 in the thickness direction is formed, and the light output from the light output portion of the light-guide sheet 50 passes through the light transmitting hole from the back surface of the decorative sheet 70 to be output from an opening (output portion) of the light transmitting hole in the front surface 70b.

Examples of the transparent material include the same materials as the transparent material forming the light-guide sheet 50 in the three-dimensional sensor 1 according to the first embodiment.

Examples of the opaque material include the colored transparent material.

It is preferred that the thickness of the decorative sheet 70 be as thick as possible from the viewpoint of increasing mechanical strength, but be as thin as possible from the viewpoint of easily transferring the pressing force that is input in the Z direction on the operation surface T to the easily deformable body 30. In consideration of those contradicting conditions, the thickness of the decorative sheet 70 is preferably 0.05 mm or more and 1 mm or less, more preferably 0.10 mm or more and 0.70 mm or less, even more preferably 0.10 mm or more and 0.40 mm or less, further preferably 0.10 mm or more and 0.30 mm or less, particularly preferably 0.10 mm or more and 0.25 mm or less, and most preferably 0.10 mm or more and 0.20 mm or less, for example.

When the decorative sheet 70 is formed of polyethylene terephthalate, polycarbonate, polyimide, triacetyl cellulose, cyclic polyolefin, or an acrylic resin, the thickness thereof preferably falls within the suitable range described above.

When the decorative sheet 70 is formed of glass, its thickness is preferably 0.05 mm or more and 0.35 mm or less, more preferably 0.05 mm or more and 0.30 mm or less, even more preferably 0.05 mm or more and 0.25 mm or less, further preferably 0.05 mm or more and 0.20 mm or less, particularly preferably 0.05 mm or more and 0.15 mm or less, and most preferably 0.05 mm or more and 0.10 mm or less.

From the viewpoints of more easily transferring the pressing force to the easily deformable body 30 and increasing the sensitivity of sensing the input in the Z direction, a bending stiffness D2 of the decorative sheet 70, which is calculated by the following equation (2), is preferably less than 256, more preferably 32 or less, further preferably 20 or less, particularly preferably 16 or less, and most preferably 10 or less.

A lower limit value of the bending stiffness D2 is not particularly limited, and is preferably 0.1 or more.

$$D2 = (E2) \times (h2)^3 \div [12 \times \{1-(v2)^2\}], \quad \text{Equation (2)}$$

where D2, E2, h2, and v2 represent the bending stiffness (unit: N·mm), a bending modulus (unit: N/mm²), a thickness (unit: mm), and a Poisson ratio of the decorative sheet 70, respectively.

As methods of measuring the bending modulus (Young's modulus) E2, the thickness h2, and the Poisson ratio v2 of the decorative sheet 70, methods similar to the methods of measuring the bending modulus E1, the thickness h1, and the Poisson ratio v1 of the light-guide sheet 50, which have been described above, may be used.

Normally, the Poisson ratio v2 of the decorative sheet 70 is not significantly different from a general property value of the material forming the decorative sheet, and hence the general property value of the material may be provisionally used instead of the Poisson ratio v2 of the decorative sheet. Specifically, a Poisson ratio of general glass is from about 0.20 to about 0.25, and a Poisson ratio of a general thermoplastic resin is from about 0.20 to about 0.40.

The thickness of the print applied on the front surface 70b of the decorative sheet 70 is sufficiently thin (for example, 0.01 mm or less) as compared to the thickness of the decorative sheet 70, and hence the print has little effect on the bending stiffness D2 of the light-guide sheet 70.

The print may be applied not on the front surface 70b but on a back surface, which is the side opposite to the front surface 70b, of the decorative sheet 70.

From the viewpoints of more reliably transferring the pressing force to the easily deformable body 30 and increasing the sensitivity of sensing the input in the Z direction, a total of the bending stiffness D1 of the light-guide sheet 50, which is calculated by the equation (1), and the bending stiffness D2 of the decorative sheet, which is calculated by the equation (2), is preferably less than 256, more preferably 32 or less, further preferably 20 or less, particularly preferably 16 or less, and most preferably 10 or less.

A lower limit value of the total is not particularly limited, and is preferably 0.1 or more.

From the viewpoint of transferring the pressing force in the Z direction to the easily deformable body 30 more easily, a total thickness of the light-guide sheet 50 and the decorative sheet 70 is preferably 0.05 mm or more and 1 mm or less, more preferably 0.10 mm or more and 0.70 mm or less, further preferably 0.10 mm or more and 0.60 mm or less, and particularly preferably 0.10 mm or more and 0.50 mm or less, for example.

Adhesive Layer 85

As the adhesive layer 85 for bonding the light-guide sheet 50 and the decorative sheet 70, which form the three-dimensional sensor 2, to each other, an adhesive layer similar to the adhesive layers 81, 82, 83, and 84 described above is applied.

It is preferred that the adhesive layer 85 be transparent. The thickness of the adhesive layer 85 is from 1 μm to 75 μm, for example. It is preferred that the thickness of the adhesive layer using the adhesive be from 1 μm to 20 μm. It is preferred that the thickness of the adhesive layer using the pressure-sensitive adhesive be from 10 μm to 75 μm. When the thickness falls within the above-mentioned range, the adhesive layer 85 has little effect on the bending stiffness D1 and the bending stiffness D2 of the light-guide sheet 50 and the decorative sheet 70, respectively.

It is preferred that the adhesive layer 85, which bonds the light-guide sheet 50 and the decorative sheet 70 to each other, be the adhesive layer using the pressure-sensitive adhesive.

With the adhesive layer 85 being the adhesive layer using the pressure-sensitive adhesive, the adhesion between the light-guide sheet 50 and the decorative sheet 70 may be displaced (the pressure-sensitive adhesive forming the adhesive layer 85 may be displaced) when the pressing force in the Z direction is applied on the operation surface T. Therefore, the bending stiffness D1 of the light-guide sheet 50 and the bending stiffness D2 of the decorative sheet 70 do not affect each other, and the bending stiffness D1 of the light-guide sheet 50 and the bending stiffness D2 of the decorative sheet 70 can be considered separately and independently. In other words, a combined bending stiffness D' of the decorative sheet 70, the adhesive layer 85, and the light-guide sheet 50 is a total of the bending stiffnesses (D1+D2) of the sheets 50 and 70.

Meanwhile, in a case where the adhesive layer 85 is made of a curable adhesive, the bonding between the sheets 50 and 70 is strong, and hence no displacement occurs when the pressing force is applied. A combined bending stiffness D" of the decorative sheet 70, the adhesive layer 85, and the light-guide sheet 50 in this case may be a total of D1 and D2, but it is preferred that the bending stiffness D" be calculated by the following equation (3) with the light-guide sheet 50, the adhesive layer 85, and the decorative sheet 70 being considered as an integrated composite sheet.

$$\text{Bending stiffness } D'' = (E3) \times (h3)^3 \div [12 \times \{1-(v3)^2\}], \quad \text{Equation (3)}$$

where, D", E3, h3, and v3 represent the bending stiffness (unit: N·mm), a bending modulus (unit: N/mm$^2$), a thickness (unit: mm), and a Poisson ratio of the composite sheet, respectively.

As methods of measuring the bending modulus (Young's modulus) E3, the thickness h3, and the Poisson ratio v3 of the composite sheet, methods similar to the methods of measuring the bending modulus E1, the thickness h1, and the Poisson ratio v1 of the light-guide sheet 50, which have been described above, may be used.

From the viewpoints of more easily transferring the pressing force to the easily deformable body 30 and increasing the sensitivity of sensing the input in the Z direction, the bending stiffness D" of the composite sheet, which is calculated by the equation (3), is preferably less than 256, more preferably 32 or less, further preferably 20 or less, particularly preferably 16 or less, and most preferably 10 or less.

A lower limit value of the bending stiffness D" is not particularly limited, and is preferably 0.1 or more.

Third Embodiment

Figure 4:
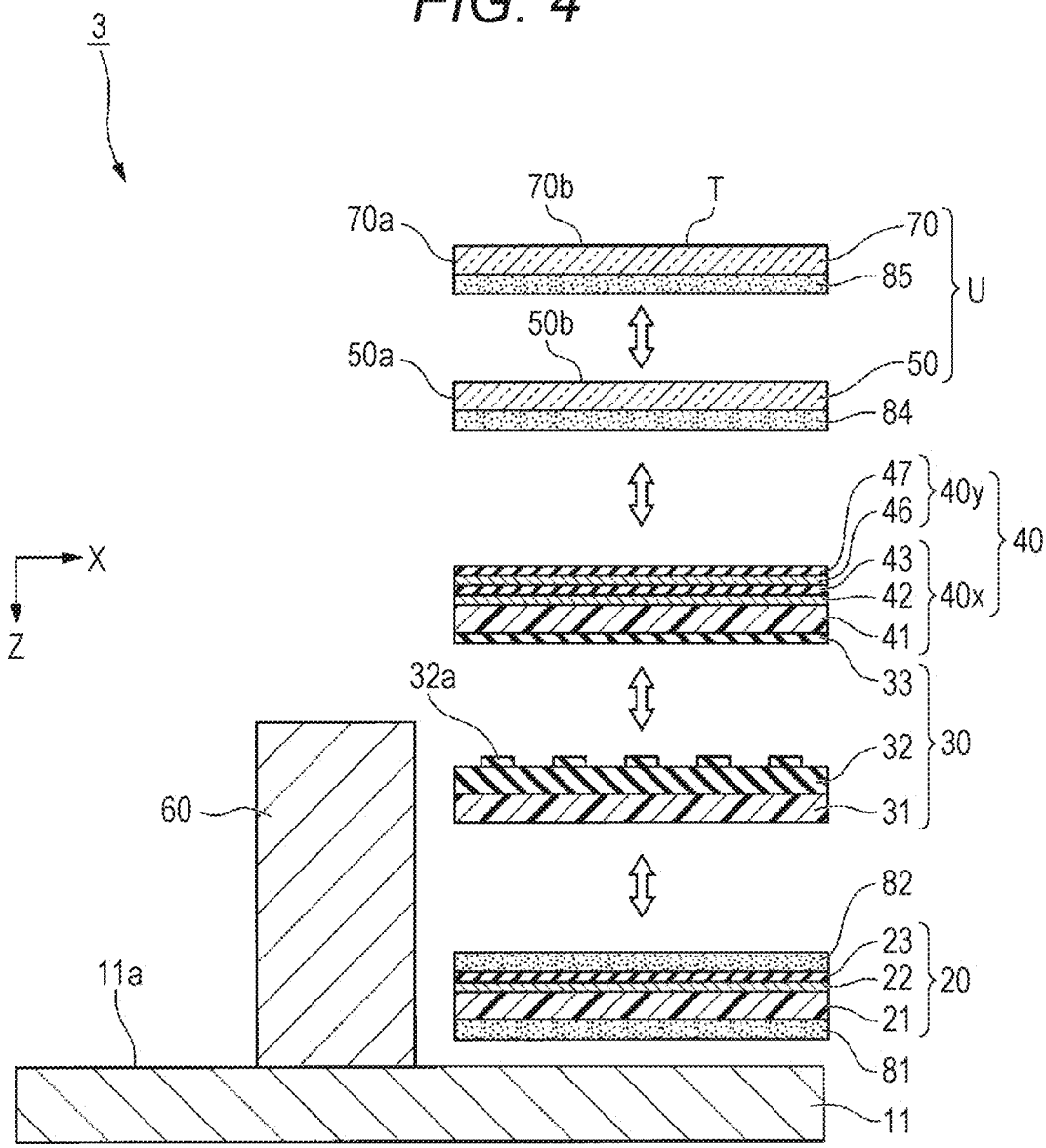
FIG. 4 is an exploded cross-sectional view of a capacitive three-dimensional sensor 3 according to a third embodiment of this disclosure.

FIG. 4 is an exploded cross-sectional view of a three-dimensional sensor 3 according to a third embodiment of this disclosure. Members that are the same as those of the three-dimensional sensor 2 according to the second embodiment are denoted by the same reference symbols, and description thereof is omitted.

A configuration of the X-Y electrode body 40 in the third embodiment is a configuration obtained by eliminating the second base material sheet 45 and the adhesive layer 83 from the X-Y electrode body 40 in the second embodiment, and is a configuration in which the conductive film 46 of the second electrode sheet 40y is formed on a front surface of the insulating film 43 of the first electrode sheet 40x.

The thickness of the X-Y electrode body 40 in the third embodiment is thinner than the thickness of the X-Y electrode body 40 in the second embodiment by the thicknesses of the second base material sheet 45 and the adhesive layer 83. Therefore, the input in the Z direction on the operation surface T is easily transferred to the easily deformable body 30 and the Z electrode body 20 through the intermediation of the X-Y electrode body 40, and the sensitivity for the input in the Z direction is increased.

The X-Y electrode body 40 in the third embodiment may be applied as the X-Y electrode body 40 in the first embodiment. Also when the X-Y electrode body 40 in the third embodiment is applied to the first embodiment, the sensitivity for the input in the Z direction is similarly increased.

Method of Manufacturing the Three-Dimensional Sensor

As a method of manufacturing the three-dimensional sensors 1 to 3 described above, a known method of manufacturing a laminated sheet, a known method of forming a conductive film, a known method of manufacturing a capacitive three-dimensional sensor, and other such methods can be applied, and examples of the method include the method of manufacturing the three-dimensional sensor described in Patent Literature 1.

A specific example is a manufacturing method including a step of producing the X-Y electrode body, a step of producing the Z electrode body, a step of producing the easily deformable body, a step of producing the light-guide sheet, a step of producing the decorative sheet, and a joining step. Now, a case of manufacturing the three-dimensional sensor 1 or 2 is described as an example of the steps.

Step of Producing the X-Y Electrode Body

In this step, the first electrode sheet 40x and the second electrode sheet 40y are produced.

On a front surface of the first base material sheet 41, a thin metal line, a routing wiring, and an external connection terminal, which form the conductive film 42, are formed, and the insulating film 43 is formed thereon to obtain the first electrode sheet 40x.

More specifically, a pattern of the thin metal line is formed on the front surface of the first base material sheet 41 by a method of printing ink containing metal particles, a method of patterning a metal foil or a metal deposition film, or other method. Further, the routing wiring is formed by a method similar to the method of forming the thin metal line. Subsequently, a conductive paste is screen-printed on an end of the routing wiring and then cured to form the external connection terminal. Thereafter, the insulating film 43 is formed by screen printing, inkjet printing, and other various printing methods so as to cover the first base material sheet 41 and the conductive film 42, to thereby obtain the first electrode sheet 40x. The second electrode sheet 40y is also produced in the same manner as the above-mentioned first electrode sheet 40x.

The first electrode sheet 40x and the second electrode sheet 40y, which have been obtained, are bonded to each other via the adhesive layer 83 made of the pressure-sensitive adhesive.

Step of Producing the Z Electrode Body

On a front surface of the third base material sheet 21, the thin metal line, the routing wiring, and the external connection terminal, which form the conductive film 22, are formed, and the insulating film 23 is formed thereon to obtain the Z electrode body 20. Specifically, the Z electrode body 20 is produced in the same manner as the first electrode sheet 40x.

Step of Producing the Easily Deformable Body

In this step, the sheet-like elastic body 32 is produced, and the elastic body 32 is bonded to the elastic body base material sheet 31. Specifically, the elastic material is formed by a press molding method, an injection molding method, a screen printing method, a cast molding method, or other known molding method to produce the sheet-like elastic body 32 having a large number of cylindrical elastic spacers 32a formed on a front surface of the sheet.

When the injection molding method is used, the elastic body 32 may be directly formed on the front surface of the elastic body base material sheet 31 by placing the elastic body base material sheet 31 in a mold in advance.

Moreover, when a method other than the injection molding method is used, there may be used a method involving injecting an uncured elastic body in a mold to cover the elastic body base material sheet 31, and heating and compressing the result to join the elastic body 32, for example.

Step of Producing the Light-Guide Sheet

When the light-guide sheet 50 of the three-dimensional sensor 1 according to the first embodiment is to be produced, in this step, a paint forming the light-shielding portion LB is printed on a front surface of the sheet made of a transparent material by gravure printing, screen printing, or other known printing method. Moreover, on the back surface of the sheet, a scattering and transmitting pattern is formed with the use of a paint that scatters light by screen printing, and further a clear layer (transparent layer) and a solid white layer are printed. As a result, the light that propagates through the light-guide sheet 50 is scattered and reflected by the back surface, and is output from the light output portions LO (region in which the light-shielding portion LB is not formed) on the front surface.

When the light-guide sheet 50 in the three-dimensional sensor 2 according to the second embodiment is produced, in this step, letters are printed optionally on the front surface of the sheet made of the transparent material, and on the back surface, a scattering and transmitting pattern is formed by screen printing with the use of a paint that scatters light, and further a clear layer (transparent layer) and a solid white layer are printed. As a result, the light that propagates through the light-guide sheet 50 is scattered and reflected by the back surface, and is output from the front surface.

Step of Producing the Decorative Sheet

In this step of producing the decorative sheet 70 in the three-dimensional sensor 2 according to the second embodiment, hard coat treatment is optionally applied on the front surface of the sheet made of the transparent material, and a paint forming the light-shielding portion LB is printed on aback surface of the sheet by gravure printing, screen printing, or other known printing method. As a result, the light output from the front surface of the light-guide sheet 50 enters the decorative sheet 70 from the region in which the light-shielding portion LB is not formed on the back surface of the decorative sheet 70, and is output from a front surface of the decorative sheet 70.

Joining Step

When the three-dimensional sensor 1 according to the first embodiment is produced, in this step, a back surface of the third base material sheet 21 of the Z electrode body 20 is bonded to the front surface 11a of the support member 11 via the adhesive layer 81 made of the pressure-sensitive adhesive. Next, a back surface of the elastic body base material sheet 31 of the easily deformable body 30 is bonded to a front surface of the insulating film 23 of the Z electrode body 20 via the adhesive layer 82 made of the pressure-sensitive adhesive. Next, aback surface of the silicone rubber sheet 33 is placed on the top surfaces of the plurality of elastic spacers 32a of the easily deformable body 30, and further a back surface of the first base material sheet 41 of the X-Y electrode body 40 is placed on a front surface of the silicone rubber sheet 33 and is joined through the intermediation of the silicone rubber sheet 33 on which the easy-adhesion treatment is performed. Subsequently, the back surface (the solid white layer) of the light-guide sheet 50 is bonded to a front surface of the insulating film 47 of the X-Y electrode body 40 via the adhesive layer 84 formed of the double-sided tape, in which a pressure-sensitive adhesive is placed on both sides of the base material layer.

In a case where the three-dimensional sensor 2 according to the second embodiment is produced, the back surface of the decorative sheet 70 is bonded to the front surface 50b of the light-guide sheet 50 via the adhesive layer 85 formed of the double-sided tape, in which a pressure-sensitive adhesive is placed on both sides of the base material layer.

Next, the light sources 60 are placed on the front surface 11a of the support member 11 by a known method in an arrangement in which the light output portions of the light sources 60 are opposed to the light entering portions LI of the side surface 50a of the light-guide sheet 50, which has already been placed by the above-mentioned bonding. As a result, the light from the light sources 60 can enter the light-guide sheet 50 through the light entering portions LI of the side surface 50a.

Through the above-mentioned steps, the three-dimensional sensor 1 or 2 is obtained.

The bonding and placement orders of the members are not limited to the above-mentioned manner, and may be performed in a desired order.

Actions and Effects

Figure 5:
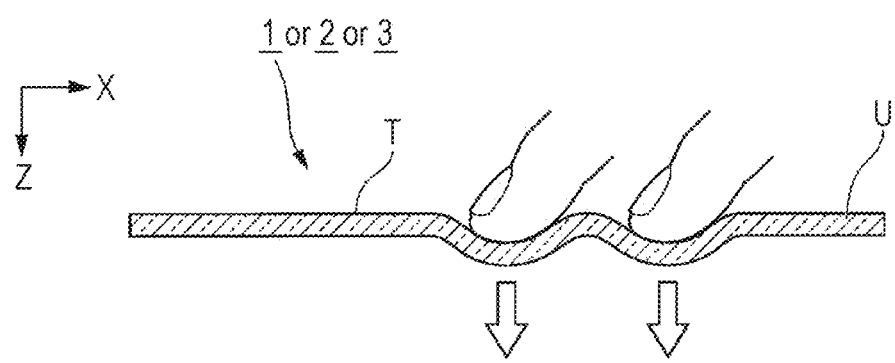
FIG. 5 is a schematic view for illustrating a cross section of a light-guide unit U of the capacitive three-dimensional sensor 1, 2, or 3 according to this disclosure and a state thereof at a time when a front surface of the sheet is pressed simultaneously with two fingers.

In the three-dimensional sensor 1 according to the first embodiment, the bending stiffness D1 of the light-guide sheet 50 forming the light-guide unit U is appropriate, and hence local pressing on the operation surface T (front surface 50b of the light-guide sheet 50) can be sensed with high sensitivity. As a result, as illustrated in FIG. 5, for example, simultaneous pressing with an index finger and a middle finger can be sensed as individual inputs.

Moreover, on the operation surface T, the light output portions LO, from which the light from the light sources 60 is output, are provided to increase operability, visibility, and decorativeness on the operation surface T. The operation surface T is formed of the front surface 50b of the light-guide sheet 50, with the result that there is no opportunity for the light that has entered the light-guide sheet 50 to be reduced by another member, and the light is output from the light output portions LO, which are provided on the front surface 50b of the light-guide sheet 50, at high luminance. Consequently, the operability, visibility, and decorativeness are increased even more.

In the three-dimensional sensor 2 according to the second embodiment, the bending stiffness D1 of the light-guide sheet 50 and the bending stiffness D2 of the decorative sheet 70, which form the light-guide unit U, are appropriate, and hence local pressing on the operation surface T (front surface 70b of the decorative sheet 70) can be sensed with high sensitivity. As a result, as in the first embodiment, simultaneous pressing with the index finger and the middle finger can be sensed as individual inputs, for example.

Moreover, the light output portions LO, from which the light from the light sources 60 is output, are provided on the decorative sheet 70 to increase operability, visibility, and decorativeness on the operation surface T. The sheet members of the adhesive layer 85 and the decorative sheet 70 are interposed between the operation surface T and the front surface 50b of the light-guide sheet 50, and hence, as compared to the first embodiment, the luminance of the light that reaches the operation surface T and is output to the front surface side is somewhat reduced. However, as compared to the case in which the light-guide sheet 50 is arranged between the Z electrode body 20 and the front surface 11a of the support member 11, for example, there are a small number of members that are interposed between the operation surface T and the light output portions LO of the light-guide sheet 50, and hence the reduction in luminance is suppressed.

Further, with the decorative sheet 70 and the light-guide sheet 50 being separate members, printing or the like may be performed on the front surface side and the back surface side of the decorative sheet to create a sense of depth, for example. Moreover, the printing or the like performed on the back surface side of the decorative sheet 70 is protected inside without being exposed, and hence durability is increased.

In the three-dimensional sensor 3 according to the third embodiment, as compared to the second embodiment, the thickness of the X-Y electrode body 40 is reduced, and hence the local pressing force on the operation surface T (front surface 70b of the decorative sheet 70) is transferred to the easily deformable body 30 more easily, and the input in the Z direction can be sensed with even higher sensitivity.

EXAMPLES

Example 1

On one surface of a PET film (bending stiffness: less than 1 N·mm) having a thickness of 50 µm, a conductive film formed of a copper-deposited film having a thickness of 0.15 µm was formed by a vacuum evaporation method, and then the conductive film was chemically-etched to form an electrode pattern. Next, an insulation paste containing an ultraviolet-curing acrylic resin was screen-printed so as to cover the PET film and the conductive film to form an uncured resin layer, and then the uncured resin layer was irradiated with ultraviolet light to form an insulating film having a thickness of 20 µm.

Through the above-mentioned method, the first electrode sheet 40x and the second electrode sheet 40y, which formed the X-Y electrode body 40, and the Z electrode body 20 were obtained.

On a back surface of the second electrode sheet 40y obtained as above, an adhesive layer, which was made of a pressure-sensitive adhesive and had a thickness of 10 µm, was formed. A front surface of the first electrode sheet 40x was brought into contact with and fixed to the adhesive layer to obtain the X-Y electrode body 40.

With the use of a mold for injection molding with which the sheet-like elastic body 32 having the large number of cylindrical elastic spacers provided on one surface thereof can be produced, a PET film having a thickness of 50 µm was placed inside the mold to injection-mold thermosetting liquid silicone. As a result, the elastic body 32 made of silicone rubber was formed and cured, and at the same time, a laminated body A in which the third base material sheet 21, which was made of the PET film, was bonded on a back surface of the elastic body 32 was obtained.

On a front surface of the insulating film of the Z electrode body 20 obtained as above, an adhesive layer, which was made of a pressure-sensitive adhesive and had a thickness of 10 µm, was formed. The back surface of the third base material sheet 21 of the above-mentioned laminated body A was brought into contact with and fixed to the adhesive layer to obtain a laminated body B.

The back surface of the X-Y electrode body 40 and a front surface of the above-mentioned laminated body B, on which the elastic spacers 32a were arranged, were brought into intimate contact with each other with an interposition of the silicone rubber sheet 33 having its surface subjected to plasma treatment to obtain an electrode laminated body (sensor sheet), in which the Z electrode body 20, the easily deformable body 30, and the X-Y electrode body 40 were laminated in the stated order.

Next, the light-guide sheets 50 made of the transparent materials shown in Table 1 were prepared, and the light-guide sheet 50 and the front surface of the X-Y electrode body 40 of the above-mentioned sensor sheet were bonded to each other with a transparent double-sided tape (thickness: 50 µm) (manufactured by 3M, model: 467MP) using a pressure-sensitive adhesive.

Further, the support member 11 including the light sources 60 was bonded to the back surface of the above-mentioned sensor sheet through the intermediation of the above-mentioned transparent double-sided tape to obtain the three-dimensional sensor 1 illustrated in FIG. 1.

The dimensions of a detectable area of the operation surface T in the produced three-dimensional sensor 1 were 48 mm in length by 88 mm in width.

Evaluation of Z Sensitivity

The sensitivity (Z sensitivity) of sensing the input in the Z direction by pressing the operation surface T of the three-dimensional sensor 1 was evaluated by the following method.

Specifically, ΔC {(capacitance value after the load was applied)-(capacitance value before the load was applied)} was measured using a capacitance detection IC. Here, the capacitance value is a capacitance between the conductive film of the Z electrode body 20 on the receiver side and the conductive film of the first electrode sheet 40x on the transmitter side. As a numerical value of ΔC becomes larger, it means that Z sensitivity becomes higher.

As a method of pressing the operation surface T, there was used a method of using a cylindrical metal stick (plunger) having a diameter of 10 mm and connected to GND and pressing a circular distal end of the plunger against the operation surface T to apply a load of 700 g.

Of the detectable area of the operation surface T, an area of 24 mm in length by 24 mm in width was used, and in a grid obtained by dividing the area into vertical and horizontal 6×6=36 cells, the individual cells could sense the input (ΔC) in the Z direction.

The area in which the distal end of the plunger is brought into contact with the operation surface T includes about four cells. In other words, when the operation surface T is pressed with the plunger, the numerical value of ΔC is measured in at least four cells at the same time. Therefore, numerical values of ΔC measured in 36 cells in response to one pressing were sorted in the descending order, with a total value of measured values of the first four cells being defined as "ΔC @4 cells" and a total value of measured values of 36 cells being defined as "ΔC @36 cells".

The types of the light-guide sheets 50 and measurement results of ΔC (unit: fF) in three-dimensional sensors 1 including the respective light-guide sheets 50 are shown in Table 1.

TABLE 1

| Material | Thickness mm | Young's modulus N/mm² | Poisson ratio | D value N · mm | ΔC @4 cells When 700 g is applied | ΔC @36 cells When 700 g is applied | Dispersion ratio of ΔC When 700 g is applied |
|---|---|---|---|---|---|---|---|
| Polycarbonate | 0.2 | 2,600 | 0.39 | 2 | 121 | 168 | 39% |
| PET | 0.2 | 3,700 | 0.21 | 3 | 126 | 173 | 37% |
| Glass | 0.1 | 70,000 | 0.23 | 6 | 88 | 139 | 58% |
| Polycarbonate | 0.4 | 2,600 | 0.39 | 16 | 102 | 157 | 54% |

TABLE 1-continued

| Material | Thickness mm | Young's modulus N/mm² | Poisson ratio | D value N·mm | ΔC @4 cells When 700 g is applied | ΔC @36 cells When 700 g is applied | Dispersion ratio of ΔC When 700 g is applied |
|---|---|---|---|---|---|---|---|
| Polycarbonate | 0.5 | 2,600 | 0.39 | 32 | 99 | 157 | 59% |
| Polycarbonate | 0.7 | 2,600 | 0.39 | 88 | 81 | 144 | 78% |
| Glass | 0.3 | 70,000 | 0.23 | 166 | 79 | 133 | 68% |
| Polycarbonate | 1 | 2,600 | 0.39 | 256 | 81 | 158 | 95% |
| Glass | 0.4 | 70,000 | 0.23 | 394 | 60 | 134 | 123% |
| Glass | 0.5 | 70,000 | 0.23 | 770 | 47 | 107 | 128% |
| Glass | 0.67 | 70,000 | 0.23 | 1,852 | 39 | 107 | 174% |
| Polycarbonate | 2 | 2,600 | 0.39 | 2,044 | 48 | 148 | 208% |
| Glass | 0.7 | 70,000 | 0.23 | 2,113 | 30 | 89 | 197% |

In Table 1, the "D value" is the bending stiffness D1 (unit: N·mm) of the light-guide sheet 50, and the "Young's modulus" is the bending modulus (unit: N/mm²).

The "dispersion ratio of ΔC" in Table 1 is calculated by the equation:

[{(ΔC @36 cells)−(ΔC @4 cells)}÷(ΔC @4 cells)]× 100%, and is an indicator for measuring how much the deformation occurring at the part pressed by the plunger affected the periphery. As the numerical value becomes smaller, it is indicated that the deformation at the pressed part becomes larger, and that the deformation that affected the periphery becomes smaller, and it means that the resolution of identifying the pressed part on the operation surface T becomes higher.

Figure 6:
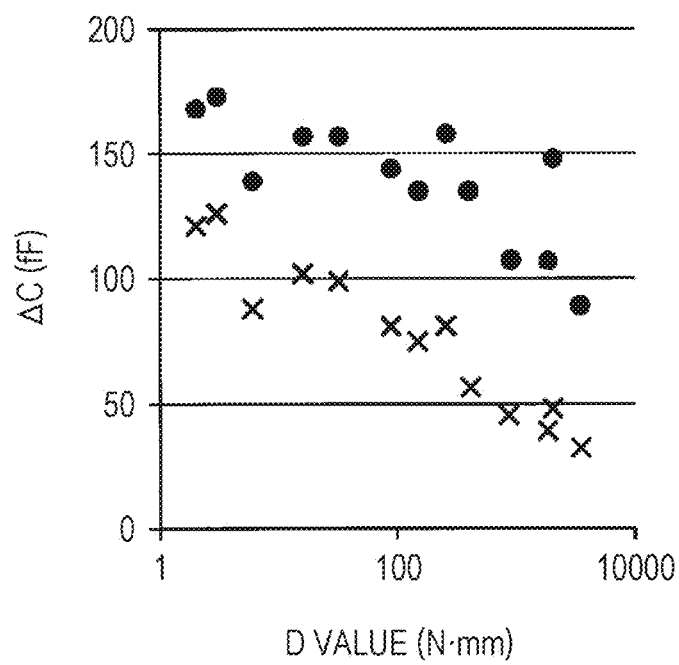
FIG. 6 is a distribution chart of measurement results of Example 1, with the vertical axis indicating ΔC, which represents Z sensitivity, and the horizontal axis indicating a bending stiffness D1.

Based on the result of Table 1, it can be said that ΔC @4 cells and the bending stiffness D1 are in an inversely proportional relationship. This relationship is also clear from a distribution chart (FIG. 6) with the vertical axis indicating ΔC and the horizontal axis indicating the bending stiffness D1. In the distribution chart, "x" plots indicate results of ΔC @4 cells, and "•" plots indicate results of ΔC @36 cells.

Figure 7:
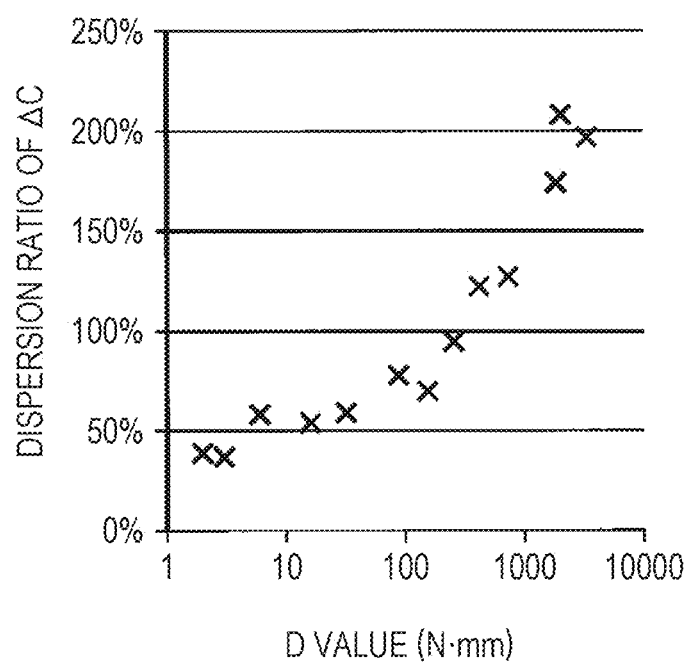
FIG. 7 is a distribution chart of the measurement results of Example 1, with the vertical axis indicating a dispersion ratio of ΔC which represents the Z sensitivity, and the horizontal axis indicating the bending stiffness D1.

It is also apparent from the result of Table 1 that, as the bending stiffness D1 becomes larger, the dispersion ratio of ΔC tends to become larger. This tendency is also clear from a distribution chart (FIG. 7) with the vertical axis indicating the dispersion ratio of ΔC and the horizontal axis indicating the bending stiffness D1.

From the above results, it is clear that, with the same material, as the bending stiffness D1 becomes smaller, the Z sensitivity becomes higher, and the dispersion ratio of ΔC becomes smaller, that is, the resolution of identifying the pressed part becomes higher.

In order to obtain good Z sensitivity, and to increase the resolution of identifying the pressed part on the operation surface T, the bending stiffness D1 of the light-guide sheet 50 of the three-dimensional sensor 1 is preferably less than 256, more preferably 88 or less, further preferably 32 or less, even more preferably 20 or less, particularly preferably 16 or less, and most preferably 10 or less.

The sensitivities (XY sensitivities) of sensing the inputs in the X and Y directions and light output efficiency from the light output portion of the light-guide sheet 50 were good when any of the light-guide sheets 50 was used.

Example 2

As in Example 1, an electrode laminated body (sensor sheet) in which the Z electrode body 20, the easily deformable body 30, and the X-Y electrode body 40 were laminated in the stated order was obtained.

Next, the light-guide sheet 50 made of the transparent material shown in Table 2 (indicated as "first layer" in Table 2) was prepared, and the light-guide sheet 50 and the front surface of the X-Y electrode body 40 of the above-mentioned sensor sheet were bonded to each other through the intermediation of a transparent double-sided tape (thickness: 50 μm) (manufactured by 3M, model: 467MP) using a pressure-sensitive adhesive.

Subsequently, the decorative sheet 70 made of the transparent material shown in Table 2 (indicated as "second layer" in Table 2) was prepared, and the decorative sheet 70 and the front surface of the above-mentioned light-guide sheet 50 were bonded to each other through intermediation of the above-mentioned transparent double-sided tape.

Further, the support member 11 including the light sources 60 was bonded to the back surface of the above-mentioned sensor sheet through the intermediation of the above-mentioned transparent double-sided tape to obtain the three-dimensional sensor 2 illustrated in FIG. 3.

Evaluation of Z Sensitivity

The sensitivity (Z sensitivity) of sensing the input in the Z direction by pressing the operation surface T of the three-dimensional sensor 2 was evaluated by the same method as that in Example 1. The results are shown in Table 2.

TABLE 2

| Material | Thickness | | | Young's modulus N/mm² | Poisson ratio | D value N·mm | ΔC @4 cells When 700 g is applied | ΔC @36 cells When 700 g is applied | Dispersion ratio of ΔC When 700 g is applied |
|---|---|---|---|---|---|---|---|---|---|
| | Total thickness mm | First layer mm | Second layer mm | | | | | | |
| Polycarbonate | 0.4 | 0.4 | | 2,600 | 0.39 | 16 | 102 | 157 | 54% |
| Polycarbonate | 0.4 | 0.2 | 0.2 | 2,600 | 0.39 | <16 | 119 | 168 | 41% |
| Polycarbonate | 1 | 1 | | 2,600 | 0.39 | 256 | 81 | 158 | 95% |

TABLE 2-continued

| Material | Thickness Total thickness mm | Thickness First layer mm | Thickness Second layer mm | Young's modulus N/mm² | Poisson ratio | D value N·mm | ΔC @4 cells When 700 g is applied | ΔC @36 cells When 700 g is applied | Dispersion ratio of ΔC When 700 g is applied |
|---|---|---|---|---|---|---|---|---|---|
| Polycarbonate | 1 | 0.5 | 0.5 | 2,600 | 0.39 | <256 | 85 | 145 | 71% |
| Polycarbonate | 1 | 0.2 | 0.8 | 2,600 | 0.39 | <256 | 79 | 145 | 84% |

In Table 2, the "first layer" indicates the light-guide sheet 50, the "second layer" indicates the decorative sheet 70, and when the "second layer" is crossed out, it is indicated that the decorative sheet 70 is not provided. The sensor without the decorative sheet 70 is the three-dimensional sensor 1 of Example 1, and is shown here for comparison.

In Table 2, the "D value" in Table 2 indicates a total value (D1+D2) of the bending stiffness D1 (unit: N·mm) of the light-guide sheet 50 and the bending stiffness D2 of the decorative sheet 70. Moreover, the "Young's modulus" is the bending modulus (unit: N/mm²).

The "dispersion ratio of ΔC" in Table 2 is calculated as in Example 1, and has a similar meaning.

In Table 2, it is indicated that, under the same conditions of the material and the total thickness, the D value (D1+D2) obtained by bonding two thin sheets to each other via a pressure-sensitive adhesive is lower than the D value (D1) of one thick sheet. Here, the total thickness does not include the thickness of the adhesive layer.

Moreover, as the total value of the bending stiffness D1 and the bending stiffness D2 becomes smaller, the Z sensitivity becomes higher, and the dispersion ratio of ΔC becomes smaller, that is, the resolution of identifying the pressed part becomes higher as with the results of Example 1.

From measurement results of Table 2, it can be seen that, with the same material and total thickness of the light-guide sheet 50 and the decorative sheet 70, the three-dimensional sensor 2 of Example 2 is better than the three-dimensional sensor 1 of Example 1 in terms of ΔC @4 cells, ΔC @36 cells, and the dispersion ratio of ΔC. In other words, it can be said that, when compared under comparable conditions, the three-dimensional sensor 2 of Example 2 excels in terms of the Z sensitivity and the resolution of identifying the pressed part.

It can be seen from the measurement results of Table 2 that ΔC @4 cells and the dispersion ratio of ΔC are better when a thickness A of the light-guide sheet 50 and a thickness B of the decorative sheet 70 are the same (thickness A:thickness B=1:1) or approximate (thickness A:thickness B=1:2 to 2:1) than when the thickness A and the thickness B are different (thickness A:thickness B=5:1 to 3:1 or 1:3 to 1:5).

The sensitivities (XY sensitivities) of sensing the inputs in the X and Y directions and light output efficiency from the light output portion of the decorative sheet 70 were good when any of the decorative sheets 70 and the light-guide sheets 50 were used.

Example 3

Evaluation of the Resolution of Identifying the Pressed Part

With the use of the three-dimensional sensor 1 produced in Example 1, two plungers described above were simultaneously pressed against the operation surface T to apply a total load of 1,000 g, and 24 mm in length by 32 mm in width of the above-mentioned detectable area was used to measure ΔC in a grid of vertical and horizontal 6×8=48 cells. A separation distance between two circular parts pressed by the two plungers was set to 14 mm between the centers, and to 4 mm between the closest points. Results measured for different types of the light-guide sheets 50 are shown in FIG. 8.

In FIG. 8, the measurement results for three-dimensional sensors 1 including polycarbonate sheets having thicknesses of 0.2 mm, 0.4 mm, 0.7 mm, 1 mm, and 2 mm, which are shown in Table 1, as the light-guide sheets 50, and the measurement result for the three-dimensional sensor 1 including a glass sheet having a thickness of 0.67 mm are shown as polygons. The height of each polygon indicates the magnitude of ΔC, and the position of each polygon substantially corresponds to the two-dimensional plane of the operation surface T.

The three-dimensional sensor 1 including a polycarbonate sheet having the thickness of 0.2 mm and the bending stiffness D1=2 N·mm ("0.2 mm PC" in FIG. 8) as the light-guide sheet 50 senses the pressing by the two plungers as two separate peaks. Similarly, the three-dimensional sensors 1 of "0.4 mm PC" having the thickness of 0.4 mm and the bending stiffness D1=16 N·mm and "0.7 mm PC" having the thickness of 0.7 mm and the bending stiffness D1=88 N·mm also sense the pressing by the two plungers as two separate peaks. These two plungers imitate two fingers, and it means that pressing by individual fingers can be independently sensed for signal processing.

Meanwhile, the three-dimensional sensors 1 of "1 mm PC" having the thickness of 1 mm and the bending stiffness D1=256 N·mm; "2 mm PC" having the thickness of 2 mm and the bending stiffness D1=2044 N·mm; and "0 .67 mm_glass" having a thickness of 0.67 mm and the bending stiffness D1=1852 N·mm sense pressing by the two plungers as a single peak, and the two pressing points cannot be separated and are sensed as a single pressing point.

It can be seen from Table 1 and the results of FIG. 8 described above, in order to separately and independently sense individual pressing when two proximate points on the operation surface are pressed at the same time, the bending stiffness D1 of the light-guide sheet 50 is preferably less than 256 N·mm, more preferably 88 N·mm or less, and further preferably 16 N·mm or less.

From the same viewpoint as described above, it can be seen that the dispersion ratio of ΔC is preferably 80% or less, more preferably 60% or less, and further preferably 40% or less.

Moreover, based on Table 2 and the results of FIG. 8, when the thickness of the light-guide sheet 50 included in the three-dimensional sensor 1 of Example 1 and the total thickness of the light-guide sheet 50 and the decorative sheet 70 included in the three-dimensional sensor 2 of Example 2 are the same, the D value (D1+D2) of the three-dimensional sensor 2 of Example 2 is smaller, and the resolution of identifying the pressed part is higher. Therefore, when two proximate points on the operation surface are pressed at the same time, the three-dimensional sensor 2 of Example 2 may be advantageous in sensing individual pressing separately and independently.

It is apparent from the results described above that the three-dimensional sensor according to this disclosure has excellent sensitivity for the input in the Z direction.

REFERENCE SIGNS LIST 1 to 3 . . . three-dimensional sensor, 11 . . . support member, 20 . . . Z electrode body, 21 . . . third base material sheet, 22 . . . conductive film, 23 . . . insulating film, 30 . . . easily deformable body, 31 . . . elastic body base material sheet, 32 . . . elastic body, 32a . . . elastic spacer, 33 . . . silicone rubber sheet, 40 . . . X-Y electrode body, 40x . . . first electrode sheet, 40y . . . second electrode sheet, 41 . . . first base material sheet, 42 . . . conductive film, 43 . . . insulating film, 45 . . . second base material sheet, 46 . . . conductive film, 47 . . . insulating film, 50 . . . light-guide sheet, 60 . . . light source, 70 . . . decorative sheet, 81 to 85 . . . adhesive layer

The invention claimed is:

1. A capacitive three-dimensional sensor, which is configured to sense inputs in plane X and Y directions and a depth Z direction, the capacitive three-dimensional sensor comprising:
a light-guide unit having a side surface and an operation surface, the side surface being formed along the depth Z direction and including a light entering portion, through which light from a light source enters, the operation surface being configured to input the inputs and including a light output portion, from which the light exits;
a sheet-like X-Y electrode body configured to sense the inputs in the plane X and Y directions;
a deformable body including a sheet-like elastic body; and
a sheet-like Z electrode body configured to sense the input in the depth Z direction,
the light-guide unit, the sheet-like X-Y electrode body, the deformable body, and the sheet-like Z electrode body being arranged in the stated order to overlap one another when viewed in the depth Z direction,
the light-guide unit including a decorative sheet, which is provided optionally, and a light-guide sheet configured to guide the light that has entered the light-guide unit from the side surface and output the light toward the light output portion,
the decorative sheet and the light-guide sheet being arranged in the stated order to overlap each other when viewed in the depth Z direction,
the light-guide sheet having a bending stiffness D1 calculated by the following equation (1) and the decorative sheet having a bending stiffness D2 calculated by the following equation (2), D1 and D2 totaling less than 256:

$$D1=(E1)\times(h1)^3 \div [12\times\{1-(v1)^2\}]$$ Equation (1)

$$D2=(E2)\times(h2)^3 \div [12\times\{1-(v2)2\}]$$ Equation (2)

where D1, E1, h1, and v1 represent the bending stiffness (unit: N·mm), a bending modulus (unit: N/mm$^2$), a thickness (unit: mm), and a Poisson ratio of the light-guide sheet, respectively, and D2, E2, h2, and v2 represent the bending stiffness (unit: N·mm), a bending modulus (unit: N/mm2), a thickness (unit: mm), and a Poisson ratio of the decorative sheet, respectively.

2. The capacitive three-dimensional sensor according to claim 1, wherein the thickness of the light-guide sheet is 0.1 mm or more and 0.7 mm or less.

3. The capacitive three-dimensional sensor according to claim 1, wherein the thickness of the decorative sheet is 0.1 mm or more and 0.7 mm or less.

4. The capacitive three-dimensional sensor according to claim 2, wherein the thickness of the decorative sheet is 0.1 mm or more and 0.7 mm or less.

5. The capacitive three-dimensional sensor according to claim 1, wherein the sum of the thickness of the light-guide sheet and the thickness of the decorative sheet is 0.1 mm or more and 0.7 mm or less.

6. The capacitive three-dimensional sensor according to claim 2, wherein the sum of the thickness of the light-guide sheet and the thickness of the decorative sheet is 0.1 mm or more and 0.7 mm or less.

7. A capacitive three-dimensional sensor according to claim 3, wherein the sum of the thickness of the light-guide sheet and the thickness of the decorative sheet is 0.1 mm or more and 0.7 mm or less.

8. The capacitive three-dimensional sensor according to claim 4, wherein the sum of the thickness of the light-guide sheet and the thickness of the decorative sheet is 0.1 mm or more and 0.7 mm or less.

9. The capacitive three-dimensional sensor according to claim 1, wherein the decorative sheet is bonded on a surface of the light-guide sheet via a pressure-sensitive adhesive.

10. The capacitive three-dimensional sensor according to claim 2, wherein the decorative sheet is bonded on a surface of the light-guide sheet via a pressure-sensitive adhesive.

11. The capacitive three-dimensional sensor according to claim 3, wherein the decorative sheet is bonded on a surface of the light-guide sheet via a pressure-sensitive adhesive.

12. The capacitive three-dimensional sensor according to claim 4, wherein the decorative sheet is bonded on a surface of the light-guide sheet via a pressure-sensitive adhesive.

13. The capacitive three-dimensional sensor according to claim 5, wherein the decorative sheet is bonded on a surface of the light-guide sheet via a pressure-sensitive adhesive.

14. The capacitive three-dimensional sensor according to claim 6, wherein the decorative sheet is bonded on a surface of the light-guide sheet via a pressure-sensitive adhesive.

15. The capacitive three-dimensional sensor according to claim 7, wherein the decorative sheet is bonded on a surface of the light-guide sheet via a pressure-sensitive adhesive.

16. The capacitive three-dimensional sensor according to claim 8, wherein the decorative sheet is bonded on a surface of the light-guide sheet via a pressure-sensitive adhesive.

17. A capacitive three-dimensional sensor according to claim 1, wherein each of the light-guide sheet and the decorative sheet is a resin sheet independently formed of a resin material.

18. A capacitive three-dimensional sensor according to claim 2, wherein each of the light-guide sheet and the decorative sheet is a resin sheet independently formed of a resin material.

19. A capacitive three-dimensional sensor according to claim 3, wherein each of the light-guide sheet and the decorative sheet is a resin sheet independently formed of a resin material.

20. A capacitive three-dimensional sensor according to claim 4, wherein each of the light-guide sheet and the decorative sheet is a resin sheet independently formed of a resin material.

* * * * *